United States Patent

[11] 3,523,521

[72] Inventor Joe E. Goodwin
  Houston, Texas
[21] Appl. No. 732,254
[22] Filed May 27, 1968
[45] Patented Aug. 11, 1970
[73] Assignee Sentinel Distributors, Inc.
  Denver, Colorado
  a Corp. of Delaware

[54] PRESSURE RESPONSIVE ENGINE FUEL SHUTOFF DEVICE WITH VARIABLE SHUTOFF POINT
  7 Claims, 6 Drawing Figs.
[52] U.S. Cl. ................................................ 123/198,
  123/196
[51] Int. Cl. ..................................................... F02b 77/08
[50] Field of Search ........................................... 123/198D2;
  1/198D3; 123/196A

[56] References Cited
UNITED STATES PATENTS

| | | | |
|---|---|---|---|
| 1,339,798 | 5/1920 | Thompson | 123/198(D2)UX |
| 1,574,260 | 2/1926 | Schaeffer | 123/198(D2)UX |
| 1,624,093 | 4/1927 | Davis | 123/198(D2)UX |
| 3,148,671 | 9/1964 | Buttorff et al | 123/198(D2)UX |
| 3,202,143 | 8/1965 | Goodwin | 123/41.15 |
| 3,366,100 | 1/1968 | Sapp | 123/198(D3)UX |

Primary Examiner— Wendell E. Burns
Attorney— Cameron, Kerkam and Sutton

ABSTRACT: A device for automatically shutting off the flow of fuel to an internal combustion engine whenever the oil pressure in a lubricating system associated with the engine falls below a desired level having means for varying the oil pressure level at which shutoff occurs in dependence on variations in the pressure of the fuel being supplied to the engine.

Patented Aug. 11, 1970 3,523,521

INVENTOR
JOE E. GOODWIN

BY *Cameron, Kerkam & Sutton*

ATTORNEYS

INVENTOR
JOE E. GOODWIN

BY Cameron, Kerkham & Sutton

ATTORNEYS 3,523,521

PRESSURE RESPONSIVE ENGINE FUEL SHUTOFF DEVICE WITH VARIABLE SHUTOFF POINT

BACKGROUND OF THE INVENTION

This invention relates to safety devices for shutting down internal combustion engines in response to abnormal pressure conditions existing in lubricating systems associated with such engines, and more particularly to protective apparatus which is adapted to shut off automatically the supply of fuel to an engine whenever the pressure of the oil lubricating the engine, or a machine driven by the engine, drops to an undesirably low point.

There have been developed in the past a number of pressure responsive engine fuel shutoff devices of this general type, of which those disclosed in my patent No. 3,202,143, dated August 24, 1965, are most closely related to those of the present invention. In these prior devices, the flow of fuel to the engine is controlled by a valve normally maintained in open position by a piston which is movable in valve opening direction by the pressure existing in the lubricating system, and in the opposite direction, to permit closing of the valve, by means of calibrated springs the strength of which is so selected as to establish the primary setting of the oil pressure level at which the fuel shutoff valve closes.

Although the valve controlling piston structures shown in my patent No. 3,202,143 are subject to a minor extent to the pressure of the fuel in opposition to the oil pressure, so that, when the fuel pressure increases, the oil pressure level at which fuel shutoff occurs is somewhat higher than the primary setting established by the springs, design and dimensional limitations do not permit attainment by these prior devices of the desired variation of the oil pressure shutoff point in relation to the variations in fuel pressure, particularly in the case of recent models of diesel engines which have an inherently low oil pressure at idling speeds.

It is therefore the objective of this invention to improve upon the devices of the prior art by providing an area within the valve controlling piston against which the fuel pressure is exerted in opposition to the force exerted on the piston by the oil pressure. In this manner, the desired ratio between oil pressure and fuel pressure at the time of fuel shutoff can be obtained without the necessity for changing the external design or dimensions of the piston and its associated elements.

SUMMARY OF THE INVENTION

The present invention resides in a pressure responsive engine fuel shutoff device which is an improvement over those shown in my prior patent No. 3,202,143, in that means are provided for subjecting an area within the fuel valve controlling piston to the pressure of the fuel being supplied to the engine so that the fuel pressure assists the calibrated springs in moving the piston in valve closing direction against the force exerted on the piston by the oil pressure.

In the simplest embodiment of the invention, the piston is provided with a socket into which one end of a valve actuating piston rod extends, and the piston rod is so formed as to provide a passageway through which the pressurized fuel may flow into the socket in the piston and thereby apply pressure against the interior area of the piston which forms the bottom of the socket. The piston rod is preferably in the form of a steel tube slotted throughout its length, and having a press fit in the socket of the piston.

DESCRIPTION OF THE PREFERRED EMBODIMENTS

Figure 1:
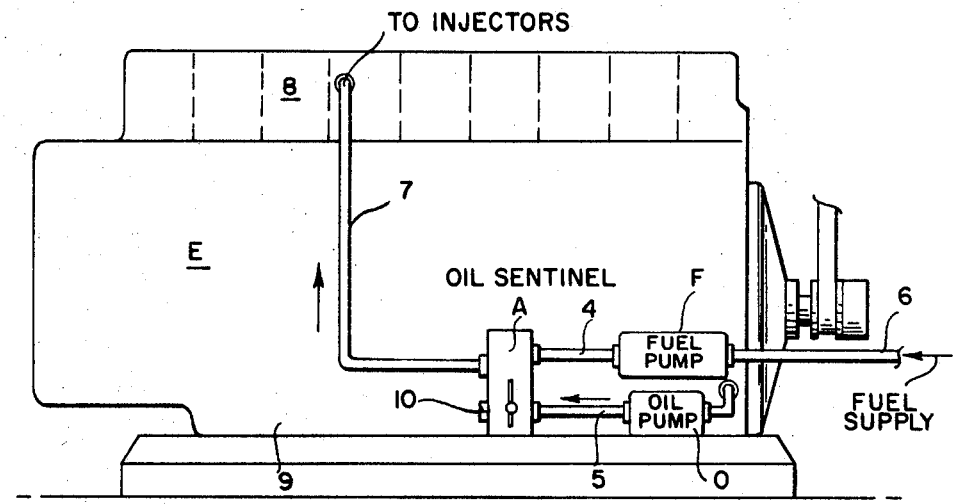
FIG. 1 is a diagrammatic side elevational view of an internal combustion engine of the fuel injection diesel type, fitted with an oil pressure responsive engine shutdown device according to the present invention.

Referring first to FIG. 1, the engine protective system there illustrated comprises an oil pressure controlled engine shutdown device or valve A in association with an internal combustion engine E of the diesel type having a conventional fuel pump F and oil pump O. For convenience, the safety device A may be referred to hereinafter as the Oil Sentinel.

In accordance with the invention, the intake side of Oil Sentinel A is connected to the pressure side of fuel pump F by line 4, and to the pressure side of oil pump O by line 5. Fuel is supplied to the pump F from a fuel tank (not shown) through a conduit 6, and passes from the Oil Sentinel A by line 7 to the injectors of the engine designated generally at 8. The oil pump O takes oil from the sump 9 of the engine E and delivers it to the intake side of Oil Sentinel A through line 5, the oil outlet port of Oil Sentinel A being plugged at 10 when it is used without a temperature controlled shutdown device or Heat Sentinel as disclosed in my prior patent.

Figures 2, 3:
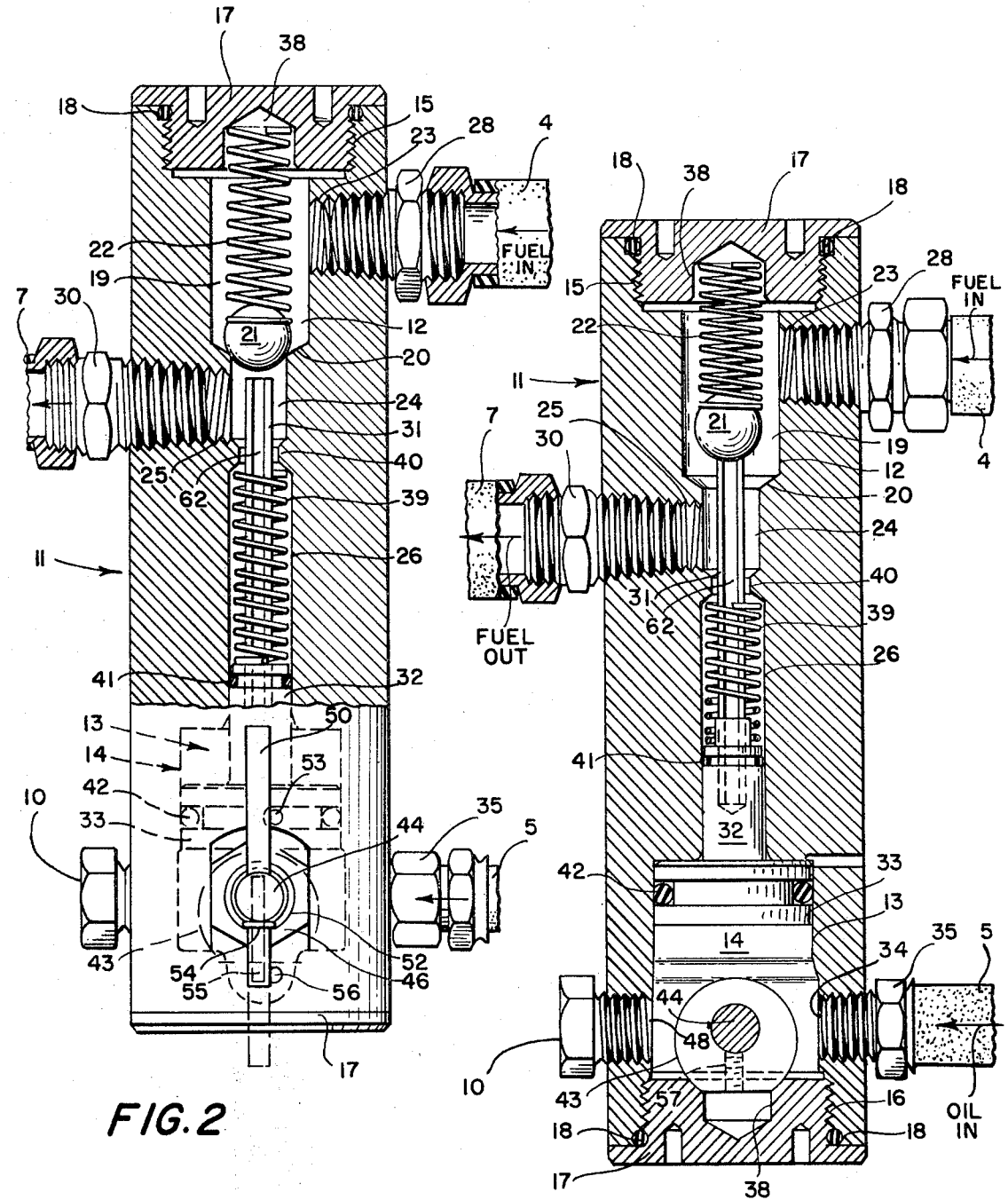
FIG. 2 is a front view, partially in elevation and partially in vertical cross section, of a preferred form of pressure controlled, piston operated, ball type liquid fuel valve embodying the invention, the valve being shown in its seated or closed position.
FIG. 3 is a vertical cross-sectional view of the valve of FIG. 2, with certain parts shown in full, showing the valve in fully open condition.

Referring now to FIGS. 2 and 3, the oil pressure controlled, fuel cutoff valve or Oil Sentinel of the present invention is of substantially the same construction as that illustrated in FIGS. 2-5 of patent No. 3,202,143, except for the specific valve controlling piston and piston rod arrangement hereinafter described. As shown, the Oil Sentinel comprises a cylindrical metallic body 11, preferably fabricated of anodized aluminum, which is of very substantial construction and is provided with an axially extending bore of varying diameter. The upper portion 12 of the bore is somewhat longer and of generally smaller diameter than the lower portion 13 which extends to the lower end of body 11 and forms a chamber 14 of relatively large cross section. The upper end of bore portion 12 opens into an enlarged counterbore which is of approximately the same diameter as chamber 14 and is provided with internal threads 15. The lower end of chamber 14 is similarly counterbored and provided with internal threads 16 of the same diameter and pitch as threads 15 so that the two ends of body 11 may be closed by a pair of identical threaded caps 17, 17. Each cap 17 is provided with a suitable sealing element 18, such as a rubber or neoprene quad ring or "O" ring.

The upper portion of the bore designated generally at 12 is further sub-divided into three interconnecting shorter length chambers. The uppermost one is a combined fuel intake and fuel valve chamber 19 having at its lower end a tapered or conical valve seat 20 adapted to receive a metallic or neoprene ball check valve 21 which is yieldably seated thereon by means of a compression spring 22. Spring 22 is preferably made of stainless steel to eliminate the adverse effect of chemical action of contaminated fuels thereon. Valve body 11 is provided adjacent its upper end with a radially extending threaded fuel inlet port 23 communicating with the chamber 19. Disposed immediately below the fuel intake and valve chamber 19 is an intermediate fuel passage and fuel output chamber 24 of less diameter than chamber 19, the body 11 being provided with a radially extending threaded fuel outlet port 25 communicating with said chamber 24. Inlet and outlet ports 23 and 25 are preferably diametrically aligned in a common vertical plane, but offset horizontally as illustrated in FIGS. 2 and 3. A third chamber 26, forming the lower end of bore portion 12 and serving as a piston chamber as described hereinafter, communicates both with the lower portion of chamber 24 and with the enlarged chamber 14 at the lower end of the valve body.

The fuel intake chamber 19 is adapted to receive fuel from fuel pump F through inlet port 23 and the hose or flexible pipe conduit 4 connected thereto by means of an adapter fitting 28, the fuel being delivered from chamber 24 through outlet port 25 by means of the similar conduit or hose 7 and fitting 30 to the injectors 8 of the engine E with which the Oil Sentinel A is associated. The flow of fuel from the inlet port 23 to the outlet port 25, through the respective chambers 19 and 24, is controlled by the action of ball valve 21 which is adapted to be moved upwardly to open position by the piston rod 31 of an operating piston 32 slidably mounted in the lowermost chamber 26 of bore portion 12 for vertical axial movement therein under the influence of opposing forces as hereinafter described. The ball valve 21 is urged downwardly into closed position on its seat 20 by spring 22 when the piston 32 is at the lower end of its stroke as shown in FIG. 2, and thereby prevents communication between chambers 19 and 24 and shuts off the flow of fuel to the engine E. The piston rod 31 is of substantially less diameter than fuel passage chamber 24 so as to permit the free flow of fuel therepast, from the inlet port 23 to the outlet port 25, when the piston 32 is moved upwardly to unseat the ball valve 21.

Connected to the lower end of piston 32 is an enlarged piston head 33 which is slidably mounted in chamber 14 formed by the lower bore portion 13. In order to raise the piston and open valve 21, the lower face of piston head 33 is exposed to the pressure of oil supplied to chamber 14 by the lubricating oil pump O (FIG. 1) through an inlet port 34, a fitting 35, and oil supply conduit 5 connected thereto.

Although the oil conduit 5 may be connected in any suitable manner to the forced feed lubricating system of the engine E with which the Oil Sentinel A is associated, it is also adapted for connection to the lubricating system of an engine-driven accessory, such as a compressor as shown in FIG. 8 of my patent No. 3,202,143. In the latter event, the oil pressure supplied to chamber 14 will be the same as that existing in the latter lubricating system of the accessory.

In order to yieldably resist the upward valve-opening movement of the ball valve 21 produced by the oil pressure in chamber 14, and to assist in automatically reclosing the valve when the oil pressure drops to an undesirably low value, the compression spring 22 is provided as aforementioned, having its lower end thrusting against the ball valve 21 and its upper end seated in a recess 38 provided in cap member 17. The force exerted on the ball valve 21 may be adjusted by using springs of different strength.

A second compression spring 39 surrounds the piston rod 31 of piston 32, seating at its upper end against a constricted shoulder 40 which divides chambers 24 and 26, and thrusting at its lower end against the operating piston 32, as shown in FIGS. 2 and 3. The force exerted on the operating piston 32 by the spring 39 may also be adjusted by using springs of different strength. The compression spring 39, aided by the pressure of the fuel in chamber 24 as hereinafter described, serves to positively move the piston 32 downwardly, permitting spring 22 to close the valve, whenever the oil pressure in chamber 14 drops below the desired cutoff point. Piston 32 and piston head 33 are provided with fuel-and-oil resistant quad ring seals 41 and 42, respectively.

It will be apparent from the foregoing and following description that the fuel valve 21 will be maintained in an elevated position, permitting a free flow of fuel from inlet port 23 through chambers 19 and 24 to outlet port 25, as long as the oil pressure in the lubricating system of the engine (or associated driven accessory) and in said chamber 14 is maintained at or above a value established by the combined force of springs 22 and 39 and the fuel pressure in chamber 24.

The Oil Sentinel A may also have its fuel valve partially opened manually when the oil pressure in chamber 14 is insufficient to raise the valve to its full open position. Such manually operable means are particularly useful when this safety device is used in conjunction with an engine-compressor unit, because it is frequently desirable to run the engine with the compressor disengaged, under which conditions the oil pressure in the lubricating system of the compressor would not hold the ball valve 21 in its open condition and the supply of fuel to the engine would be cut off.

As shown in FIGS. 2 and 3; the manually operable means for opening the fuel valve 21 comprises an eccentric cam 43 mounted in chamber 14 beneath the piston head 33 on the inner end of a shaft 44. The shaft 44 extends radially outwardly of the valve body 11 through a bushing 46 which is threaded into said body at a position halfway between oil inlet port 34 and a diametrically opposed oil outlet port 48 which, as shown, is closed by the plug 10. In the event that the Oil Sentinel is intended to be used in combination with one or more temperature controlled shutdown devices or Heat Sentinels as disclosed in FIGS. 1, 8 and 9 of my prior patent, the plug 10 may be replaced by a suitable fitting with an oil conduit connected thereto.

The cam 43 is attached to the end of shaft 44 by a setscrew 57 in a position such as to lie directly beneath the central portion of piston head 33. Cam 43 is so oriented on shaft 44 that, when the piston 32 is at the lower end of its stroke in valveclosing position, as shown in FIG. 2, the lower face of the piston head 33 abuts the low part of the cam.

The outer end of shaft 44 is provided with an operating handle 50 which passes through a diametrically extending opening in the shaft and is fixed therein in any suitable manner, as by a setscrew (not shown). Clockwise rotation of the handle and shaft through an angle of 180° rotates the cam to bring the flattened high part thereof into engagement with the piston head 33, thereby raising the piston 32 against the yieldable downward force exerted by spring 39. It is not necessary that the throw of cam 43 be great enough to raise the piston 32 over its full stroke so as to move ball valve 21 to its full open position as long as it is sufficient to partially open the valve, because under such conditions the engine E is not fully loaded.

In order to return the cam 43 automatically to the position indicated in FIGS. 2 and 3, wherein it establishes the valveclosed position of piston 32, the cam shaft 44 is surrounded by a torsion spring 52 having one end anchored to a pin 53 which is fixed to and projects axially outwardly from valve housing 11, while the other end is hooked around the handle 50 as shown at 54. The ends of the spring 52 are so disposed and the spring is coiled in such a direction that rotation of shaft 44 in a clockwise direction tightens the spring. Consequently, after shaft 44 has been rotated by handle 50 clockwise through 180° the position shown in FIG. 2, the spring 52 is so loaded that, as soon as the oil pressure in chamber 14 becomes high enough to raise piston head 33 out of contact with the flattened high part of cam 43, the spring 52 automatically rotates the shaft 44 in a counter-clockwise direction so as to return the cam 43 to its normal position. In this connection, it will be understood that, as long as the downward force exerted on the piston 32 exceeds the upward force exerted on piston head 33 by the oil pressure in chamber 14, the friction between the lower face of the piston head and the high part of the cam is sufficient to prevent rotation of shaft 44 and the cam under the influence of torsion spring 52.

The rotational movement of cam 43 and shaft 44 is limited to the desired angle of 180° by means of a limit pin 55 which is fixed to and projects transversely from shaft 44. The pin 55 is so located that, when the cam 43 is in its normal position, pin 55 abuts a lower stop pin 56 which projects radially from valve body 11 in substantial vertical alignment with the spring anchor pin 53. To raise the piston by means of the cam, it is only necessary to rotate shaft 44 until limit pin 55 comes into engagement with the pin 53 which thus also serves as an upper stop pin.

As thus far described, the Oil Sentinel of FIGS. 2 and 3 is of the same construction and mode of operation as that disclosed in the above-mentioned patent No. 3,202,143. However, as shown best in FIGS. 4-6, the piston 32 and piston rod 31 of the device of the present invention differ in structure from the corresponding elements of the patented apparatus in a manner which produces improved results and a more versatile mechanism.

Figure 4:
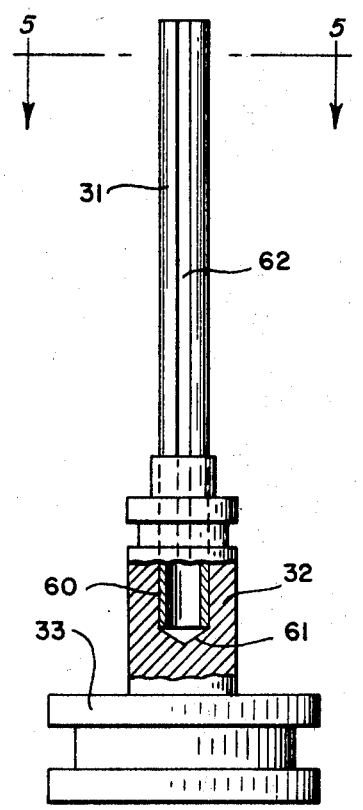
FIG. 4 is a side view, on an enlarged scale and partially in section, of the piston and piston rod assembly of the valve shown in FIGS. 2 and 3.
Figure 5:
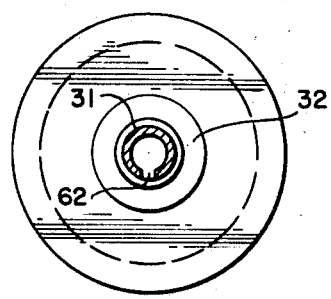
FIG. 5 is a horizontal sectional view of the piston and piston rod assembly of FIG. 4, taken substantially on the line 5-5 in FIG. 4.

Referring now to FIGS. 4 and 5 in conjunction with FIGS. 2 and 3, it will be seen that the upper portion of piston 32 is provided with an axially extending recess or socket 60 which may be drilled to form a conical base area 61 opposed to the area of piston head 33 on which the oil pressure is exerted. The piston rod 31 is formed of steel tubing and is provided with a slot 62 which may extend the full length of the rod, providing the C-shaped cross section shown in FIG. 5. The lower end of rod 31 extends into piston socket 60 and has a press fit therein.

With this construction, it is evident that the fuel flowing through chamber 24 between the fuel inlet and outlet ports 23 and 25 may enter the interior of rod 31 through slot 62, pass downwardly to the bottom of socket 60 and exert against the base area 61 a pressure which assists the springs 22 and 39 in urging piston 32 downwardly against the oil pressure exerted on piston head 33. Inasmuch as the pressure of the fuel which passes through chamber 24 on its way to the engine will vary with engine speed and load, exertion of that pressure on the internal area 61 of piston 32 will automatically vary the oil pressure level at which fuel shutoff occurs, raising it above the primary shutoff point established by springs 22 and 39, and thereby reduce the likelihood of damage to the engine in the event that the oil pressure drops to an undesirably low level.

By thus subjecting an internal area of the piston to the fuel pressure, any desired ratio between the fuel pressure and the oil pressure shutoff value may be attained without change in the external design or dimensions of the piston and piston rod. Another advantage of the construction illustrated is that Oil Sentinels of the type disclosed in patent No. 3,202,143 already in use in the field may be converted to provide the desired improved results by simply replacing their solid piston rods with slotted ones, without any other change.

Figure 6:
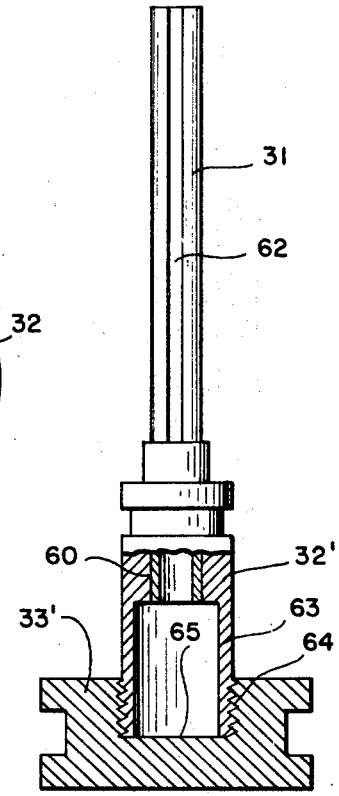
FIG. 6 is a side view, partially in section, of a modified form of piston and piston rod assembly embodying the invention.

In the event that it is desired to provide a larger area for fuel pressure exertion than is provided by the base area 61 of the socket 60 in the piston and piston rod assembly of FIG. 4, the modified construction of FIG. 6 may be used. As there shown, the piston 32' formed separately from the piston head 33' and is provided with a counterbored recess 63 connecting with socket 60, the external surface of the lower end of piston 32' being externally threaded for detachable engagement with an internally threaded bore 64 in piston head 33'. The fuel pressure is now exerted against the base 65 of recess 63, the exposed area of which may be varied to provide the desired fuel pressure/oil pressure ratio by varying the diameter of the counterbore.

There is thus provided by the present invention an improved valve mechanism for automatically controlling the flow of fuel to an internal combustion engine in response to pressure conditions existing in the lubricating system of either the engine itself, or a machine driven by the engine, which mechanism effectively utilizes the pressure of the fuel being supplied to the engine for varying the oil pressure level at which fuel shutoff occurs so as to compensate for variations in engine speed and load, a result which is particularly useful in protecting engines having high pressure fuel supply systems against damage due to lubrication failure.

I claim:

1. A device for controlling the flow of fuel to an internal combustion engine in response to the pressure conditions existing in a pressure lubricating system of the type comprising a cylindrical body having an axial extending bore therein and radially extending fuel inlet and outlet ports opening into said bore, a valve mounted in said bore for controlling the flow of fuel between said inlet and outlet ports, a piston mounted in said bore for axial movement therein having a piston rod adapted to engage and open said valve when said piston is moved in one direction, said piston having a head axially movable in a portion of said bore remote from said valve, means for subjecting said piston head to the pressure existing in the lubricating system, said pressure acting on said piston head in a direction to move the piston to a position wherein said piston rod opens said valve, and spring means for exerting on said piston a yieldable force in opposition to the force exerted on said piston head by the lubricant pressure, wherein the improvement comprises:

means for subjecting an enclosed area within the piston to the pressure of the fuel flowing through the bore between the fuel inlet and outlet ports, said area being so disposed that the fuel pressure exerted thereon is effective to assist the spring means in opposing the force exerted on the piston head by the lubricant pressure.

2. A device as claimed in Claim 1 wherein the piston includes an internal recess having a base area opposed to the area of the piston head on which the lubricant pressure is exerted, and the piston rod includes a passageway through which fuel may flow from the bore between the fuel inlet and outlet ports to said recess.

3. A device as claimed in Claim 1 wherein the piston includes a socket into which the piston rod extends, said socket having a base area opposed to the area of the piston head on which the lubricant pressure is exerted, and the piston rod includes a passageway through which the pressure of the fuel in the bore between the fuel inlet and outlet ports may be transmitted to the base area of said socket.

4. A device as claimed in Claim 3 wherein the piston rod consists of a longitudinally slotted tube, one end of which has a press fit in the socket in said piston.

5. A device as claimed in Claim 2, wherein the piston rod consists of a tube, one end of which extends into the piston in communication with the recess therein, and a portion of the tube at the other end thereof is provided with an opening through which fuel may flow from the bore between the fuel inlet and outlet ports into the tube and thence into the recess in the piston.

6. A device as claimed in Claim 1 wherein the piston includes a socket in which one end of the piston rod is received and an internal recess communicating with, and of greater diameter than, said socket, said recess having a base area opposed to the area of the piston head on which the lubricant pressure is exerted, and the piston rod includes a passageway through which fuel may flow from the bore between the fuel inlet and outlet ports into said recess.

7. A device as claimed in Claim 6 wherein the portion of the piston in which the socket and internal recess are formed is detachably connected to the piston head.